INVENTOR
HEINZ A. HERRMANN

BY

ATTORNEYS

Sept. 20, 1971   H. A. HERRMANN   3,605,645
LIQUID MOLDING MACHINE
Filed Oct. 30, 1969   4 Sheets-Sheet 4

INVENTOR
HEINZ A. HERRMANN
ATTORNEYS

United States Patent Office 3,605,645
Patented Sept. 20, 1971

3,605,645
LIQUID MOLDING MACHINE
Heinz A. Herrmann, Pennsburg, Pa., assignor to
Shelly Bros., Inc., Lansdale, Pa.
Filed Oct. 30, 1969, Ser. No. 872,614
Int. Cl. A23g *3/20;* B67c *3/20*
U.S. Cl. 107—8                            10 Claims

ABSTRACT OF THE DISCLOSURE

A machine for dispensing hot candy syrup into molds carried by a conveyor involving a valve means for controlling the flow of a measured amount of syrup from a supply bucket to a dispensing chamber from which it is dispensed into the conveyor molds.

BACKGROUND OF THE INVENTION

The present invention pertains to the field of liquid molding machines and particularly to machines of this type having means for dispensing hot candy syrup into molds carried by a conveyor.

Prior molding machines of the indicated type are disclosed in U.S. Pats. 2,868,242 and 3,280,762.

SUMMARY OF THE INVENTION

The present invention is similar to the molding machines set forth above in the background of the invention, but involves an improved means for dispensing very accurately controlled amounts of the candy syrup from the supply to the molds carried by the conveyor. Briefly stated, the dispensing means in accordance with the invention involves valve means which controls the flow of the syrup from a supply to a plurality of dispensing chambers for a predetermined time, each dispensing chamber leading to an associated discharge point which is aligned with the molds on the conveyor during a syrup dispensing operation.

DESCRIPTION OF THE PREFERRED EMBODIMENT

Figure 1:
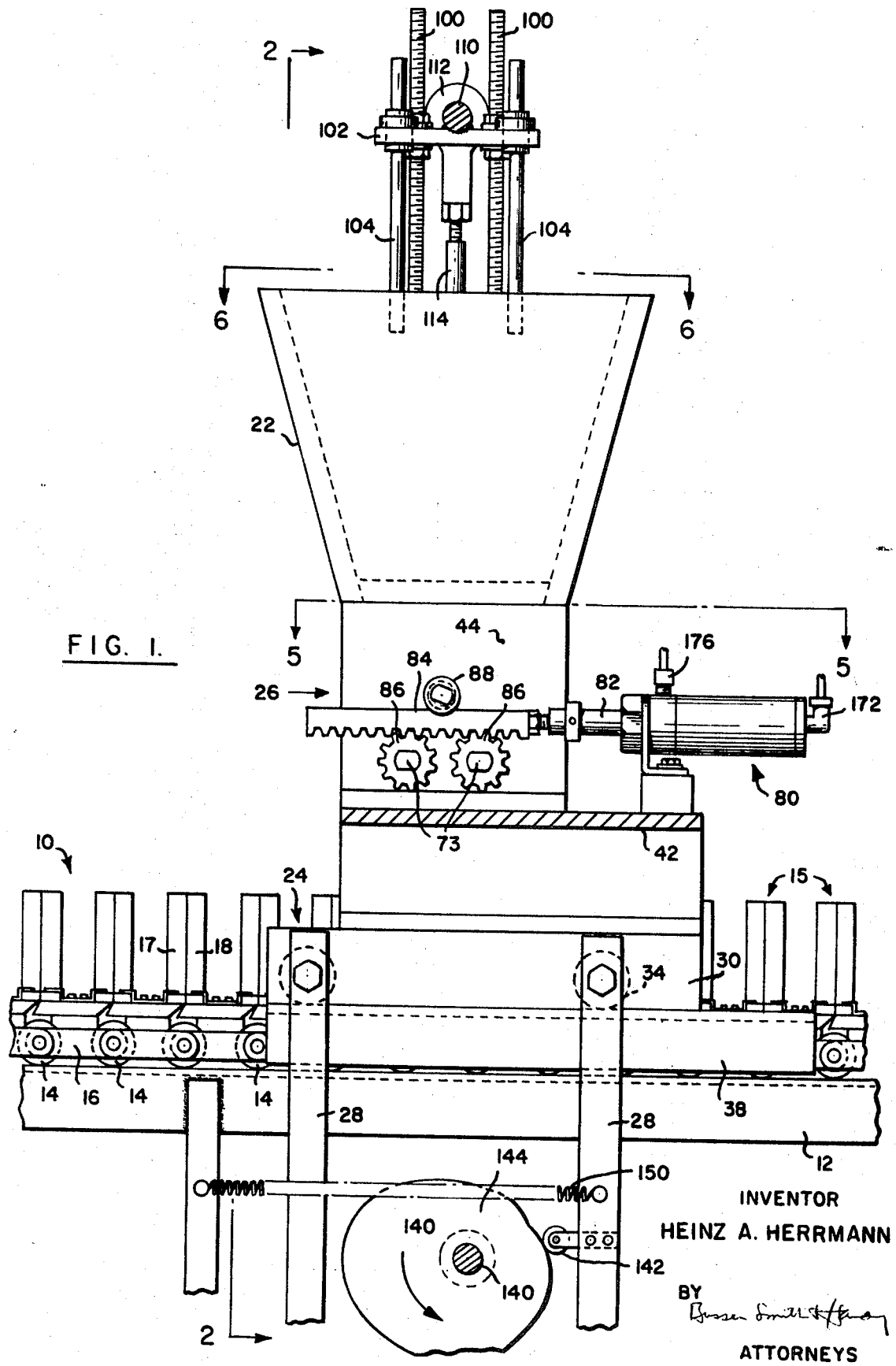
FIG. 1 is a side, elevational view of a syrup dispenser and mold conveyor for a liquid molding machine embodying the present invention and being taken on line 1—1 of FIG. 2.

The molding machine in accordance with the invention comprises an endless type conveyor such as the one disclosed in said Pat. 3,280,762. The conveyor is indicated generally at 10 and is mounted on a stationary frame, a portion of which is indicated at 12. The conveyor 10 is of the link type having rollers 14 interconnected by links 16. There is provided a plurality of molds 15 comprised of mold halves 17 and 18 which are secured to a link and roller assembly by means of brackets 20 so that each pair of mold halves form a closed mold containing three laterally spaced cavities 19.

The candy syrup dispensing means is positioned above the horizontally extending portion of the conveyor at the liquid dispensing station as shown in FIG. 1, and comprises a supply bucket 22, a carriage assembly 24, and a syrup flow control means indicated generally at 26.

Figure 2:
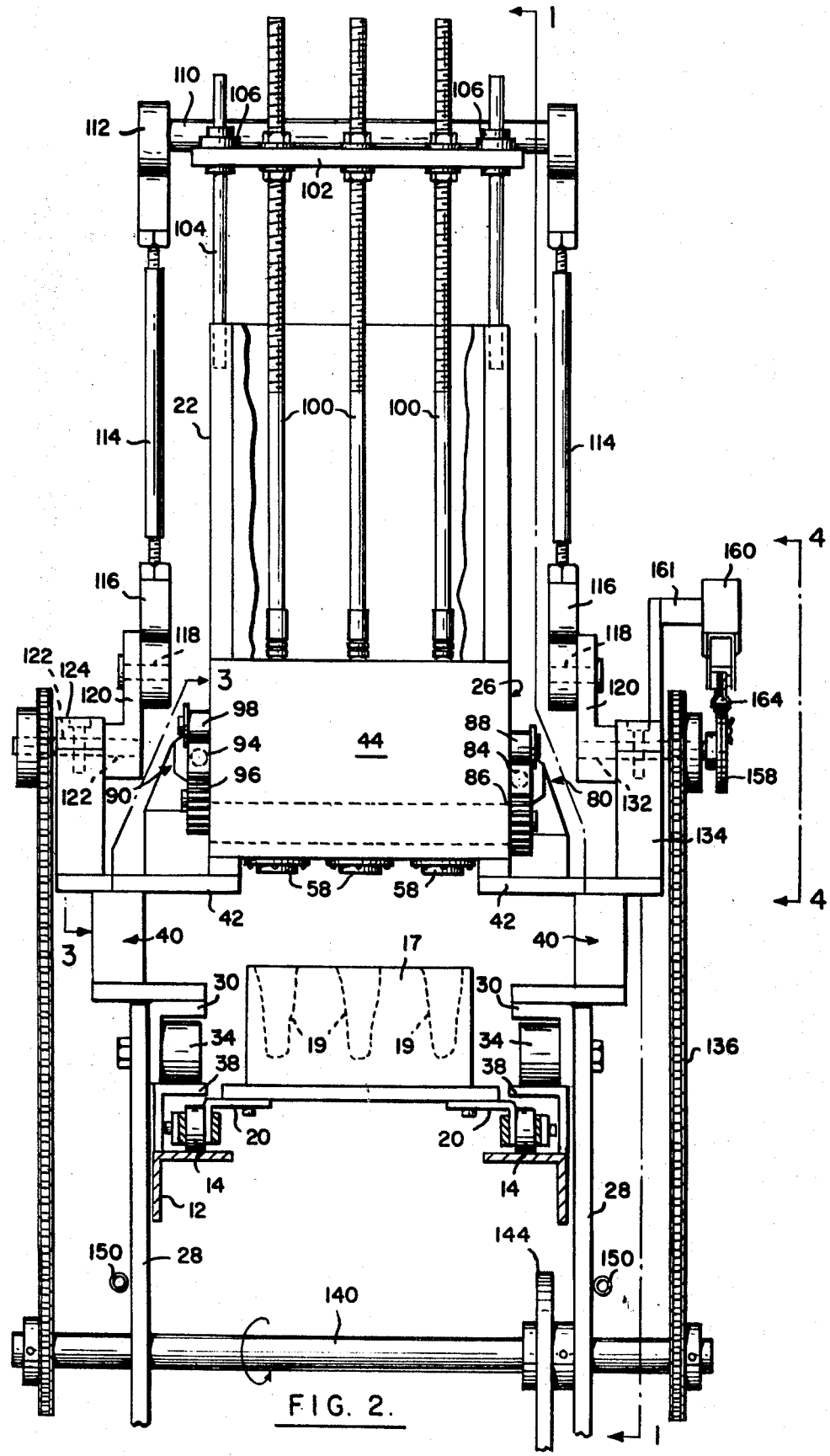
FIG. 2 is a sectional view taken generally on line 2—2 of FIG. 1 with various parts broken away to illustrate details of the construction.
Figure 3:
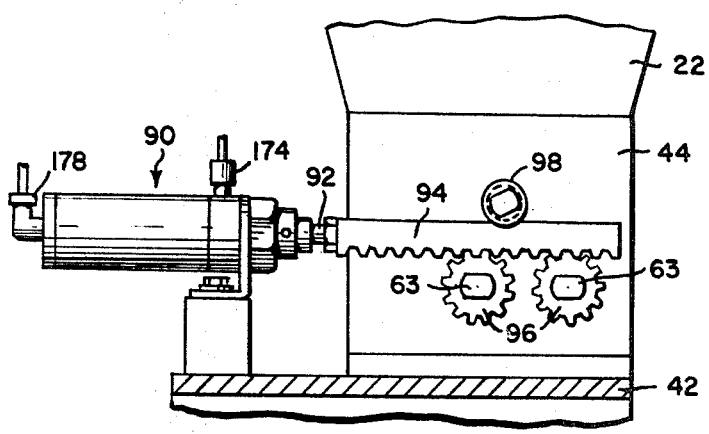
FIG. 3 is a fragmentary sectional view taken generally on line 3—3 of FIG. 2.

The carriage assembly 24 includes four vertically extending bars 28. The upper ends of the bars 28 are secured to a pair of angle members 30 which extend horizontally along opposite sides of the conveyor. Each of the members 30 carries a pair of longitudinally spaced rollers 34. The rollers 34 ride on the upper wall of a pair of angle members 38 which are mounted on top of the frame members 12 as is best shown in FIG. 2.

Mounted on the members 30 are a pair of frame supporting members 40 each of which comprises a laterally extending portion 42, which, in turn, supports the body 44 for the flow control means 26. Mounted above the body 44 is the bucket 22 for the supply of candy syrup. The bucket 22 is adapted to contain the candy syrup which is heated by the bucket which is provided with heating coils (not shown) in its walls so as to maintain a desired temperature of the syrup during the operation of the machine.

The flow of syrup through the valve assembly 26 is by way of six valve controlled flow paths which are essentially identical. Each flow path includes a vertically extending inlet passage 50 which is open at its upper end to communicate with the supply bucket at 54 and communicates at its lower end with the inlet of a measuring valve means 52. The outlet of the valve 52 communicates with a vertically extending cylindrical syrup dispensing chamber 56 which communicates at its lower end with a discharge nozzle or port 58. A discharge control valve 60 is connected in the passage 54 at a location between the outlet of valve 52 and the discharge nozzle 58.

Figure 6:
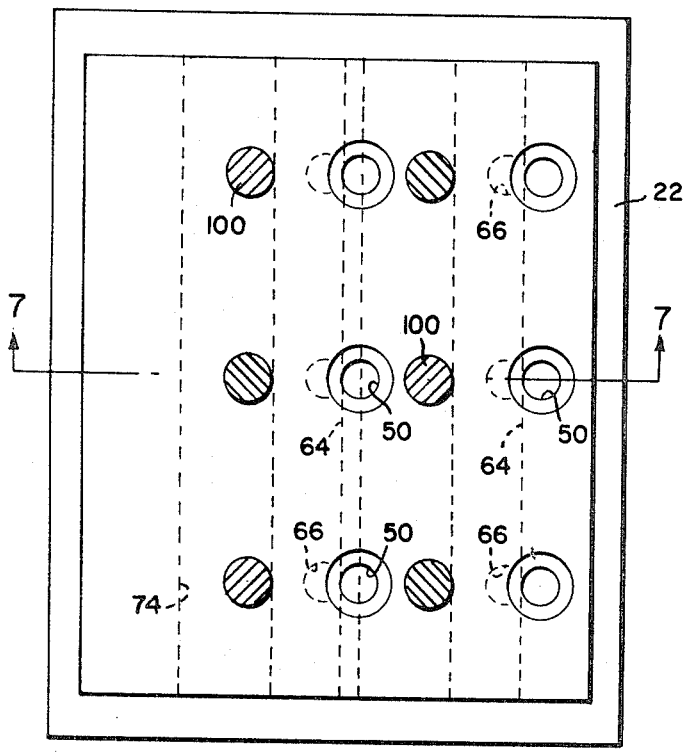
FIG. 6 is a sectional plan view taken generally on line 6—6 of FIG. 1.

There are six of the above-described flow paths, each including an inlet passage 50, a measuring valve means 52, a dispensing chamber 56, a discharge nozzle 58, and a discharge control valve 60. The flow paths are arranged in two rows of three each, as is shown in FIG. 6. As will be described hereafter, the six discharge nozzles will be aligned with the cavities 19 in the molds during the dispensing operation.

Figure 8:
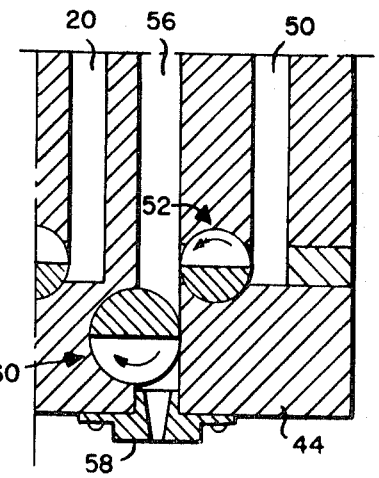
FIG. 8 is a fragmentary sectional view similar to FIG. 7 with the parts shown in an alternate position.

Three of the valve means 52 are formed by a horizontally extending rod 62 in a cylindrical bore 64 formed in the valve assembly body 44, the rod 62 being provided with three cut-out portions defining flow ports 66, each of which is aligned with one of the inlet passages 50 and an associated dispensing chamber 56. The construction is such that when the rod 62 is in the position shown in FIG. 8, i.e., the open position of the valves 52, fluid may flow from the three associated inlet passages 50 through ports 66 of the valves 52 into the associated dispensing chambers 56 as is shown in FIG. 8. There is also provided another of the rods 62 which has a similar construction for providing three more passages which communicate between associated inlet passages and dispensing chambers.

Figure 9:
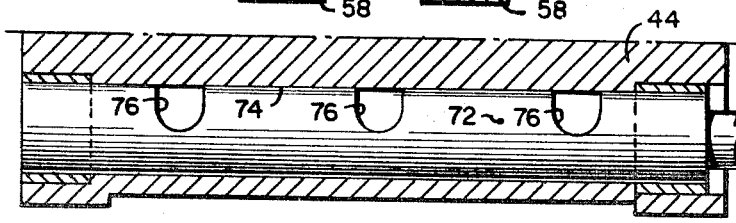
FIG. 9 is a fragmentary view of a detail.

The discharge valves 60 are provided by a pair of rods 72 which extend within bores 74 formed in the valve assembly body 44 and are constructed in a manner similar to the rods 62. The rods 72 are provided with cut-out portions, as shown in FIG. 9, defining flow ports 76 so that when the rods 72 are in the position shown in FIG. 7, flow is permitted through the dispensing chamber, and when the rods 72 are moved to the position shown in FIG. 8, flow through the dispensing passages is blocked.

Figure 5:
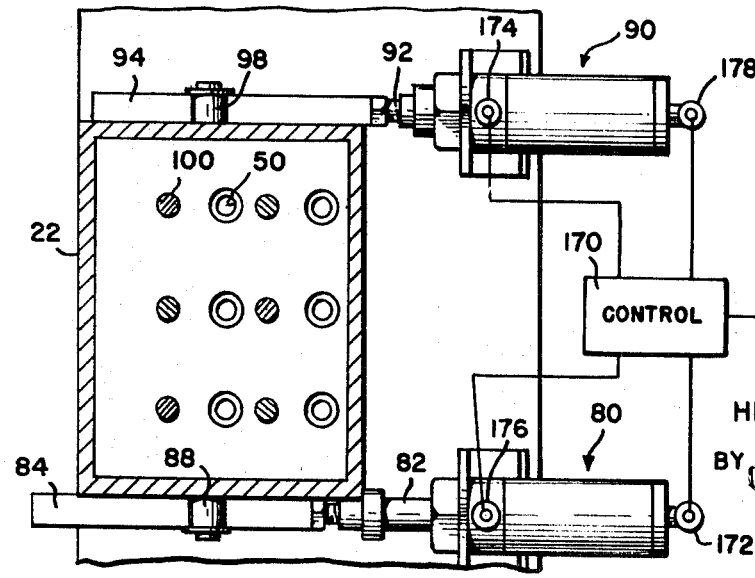
FIG. 5 is a sectional plan view taken generally on line 5—5 of FIG. 1.
Figure 7:
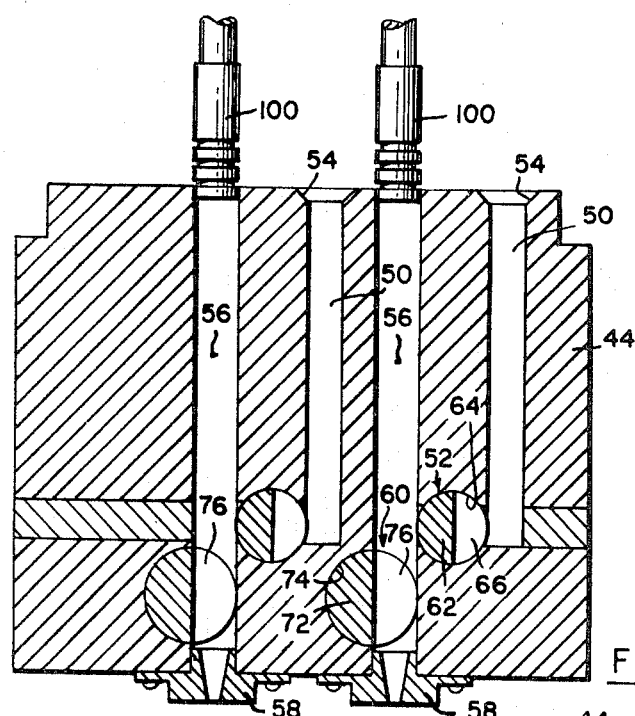
FIG. 7 is a sectional view taken egnerally on line 7—7 of FIG. 6.

Means are provided actuating the rods 62 and 72 to position the valve means 52 and 60 in their respective flow controlling positions shown in FIGS. 7 and 8. Such means comprises a first air operated actuator or ram 80 which is of conventional construction wherein a piston is moveable within the cylinder in response to the application of air to either end thereof to move an actuator rod, indicated at 82, toward and away from one end of the cylinder. Referring to FIGS. 1 and 5, it will be noted that the ram 80 is in its extended position, i.e., to the left as viewed in these figures. At its outer end, the actuator rod 82 is connected to a rack 84 which meshes with a pair of gears 86. The gears 86 are fixedly mounted on reduced diameter portions 73 of the rods 72 for the discharge valves 60. The rack 84 is guided for horizontal movement and is maintained in meshing engagement with the gears 86 by means of a guide 88 mounted on the body 44 and arranged to contact the upper side of the rack 84 as is best shown in FIGS. 1 and 2. The stroke of the ram 80 is sufficient to move the rods 72 through a quarter turn as will be seen from a comparison of FIGS. 7 and 8.

The actuating means for the rods 62 forming the valve members of the measuring valve means 52 is similar to that for the rod 72 and comprises an air actuator or ram 90 having an actuator rod 92 secured to a rack 94 which meshes with gears 96 secured to reduced diameter portions 63 at the ends of rods 62. There is a guide means 98 which maintains the engagement between the rack 94 and the gears 96. The stroke of the ram 90 is designed to effect a quarter turn of the rods 62 between the positions shown in FIGS. 7 and 8.

The manner in which the valves are operated to control the flow of syrup through the flow control means 26 will be described hereafter in connection with the description of the valve control means.

The flow control means is associated with plunger means for forcing the syrup from the dispensing chambers 56 through the discharge ports 58. Such means comprises six plungers indicated at 100, each of which is associated with one of the dispensing chambers 56 and is arranged to move slideably therethrough in the manner of a piston moving through a cylinder. At their upper ends, the plungers 100 are secured to and carried by a plate 102 which is guided for vertical movement by a plurality of guide rods 104 which are mounted fixedly in the upper ends of the walls of the bucket 22 as is best shown in FIGS. 1 and 2. The plate 102 carries suitable bearings 106 through which the guides 104 extend. A horizontally extending rod 110 is secured, as by welding, to the plate 102 and is journalled at its outer ends rotatably within a pair of members 112 which are connected to the upper ends of rods 114. The lower end of the rods 114 are connected to a pair of members 116 which are rotatably mounted on a pair of pins 118 carried by a pair of crank arms 120. The left crank arm 120 as viewed in FIG. 2 is secured on the end of a rotating shaft 122 mounted in a bearing housing 124. The crank arm 120 rotates with the shaft 122 which is driven by means of a belt 126 which is, in turn, driven from the main drive of the machine. The right crank 120, as viewed in FIG. 2, is mounted on the end of a shaft 132 which is mounted in a bearing housing 134. The shaft 132 is driven by means of a belt 136 which is connected to the same drive shaft as the belt 126 so that the crank arms 122 rotate in synchronized relationship.

It will be apparent that as the crank arms 120 are rotated by way of their drive means, the rods 114 will be oscillated upwardly and downwardly in accordance with the typical crank shaft drive whereby the plungers 100 will also be reciprocated upwardly and downwardly by reason of their connection to the rods 114 by way of the rod 110 and the plate 102. The parts are arranged so that the stroke of the plungers 100 is from the position shown in FIG. 7 downwardly to the lower end of the dispensing chambers 56 immediately above the discharge nozzles 58. It will be apparent that by this action any syrup contained within the dispensing chamber 56 will be forced out through the discharge ports 58. It will also be noted that the parts are timed so that when the plungers 100 move downwardly to the lower end of their stroke, the valves 60 will be in their open position shown in FIG. 7. The belts 126 and 136 are driven by sprockets mounted on a drive shaft 140 which is journalled in the frame of the machine, the sprocket for driving belt 126 indicated in FIG. 2. At their lower ends, the plungers 100 are provided with a ring means which serve to clean the walls of the dispensing chambers 56 during movement therewithin.

Means are provided for moving the carriage assembly along with the conveyor during a liquid dispensing operation. Such means comprises a cam follower 142 secured to the frame member 28 of the assembly and arranged to engage a cam 144 which is mounted for rotation on shaft 140. A pair of springs indicated at 150, are arranged to bias the carriage assembly 24 to the left as viewed in FIG. 1 to thereby urge the cam follower 142 into contact with the surface of the cam 144. It will be apparent that the cam 144 is shaped so that as the shaft 140 rotates from position shown in FIG. 1 it will move the carriage assembly toward the right as viewed in FIG. 1, which movement is designed to correspond to the movement of the conveyor 10. Moreover, the parts are designed so that this movement is coincident during the syrup dispensing operation and such that the cavities 19 in the molds are aligned directly beneath the discharge ports 58 of the syrup dispensing mechanism.

Means are provided for controlling the operation of the rams 80 and 90 so as to actuate the valve means 52 and 60 to the desired flow controlling positions. Such means comprises a cam 158 mounted on the end of shaft 132 as shown in FIG. 2. A cam actuated switch 160 is supported on the bearing means 134 by a bracket 161 and is arranged to be actuated by the cam 158. The switch 160 is of a conventional construction and is actuated by means of a pivoted arm 162 which carries a roller 164 which rides on the surface of cam 158. The arm 162 is arranged to contact a switch actuating pin 166 and move the same inwardly and outwardly to actuate the switch 160 between a pair of control positions.

In the one control position of the switch 160, the pin 166 is in its extended position. In this position of the control, rams 80 and 90 and the valve means 52 and 60 are in the position shown in FIGS. 5 and 7. In this condition of the machine, the ram 80 has been actuated to its extended position to thereby position the valve means 60 in the open position shown in FIG. 7. This is accomplished by a control indicated generally at 170 which has applied air under pressure to the fitting 172 of ram 80 to force the same to the left and extend the actuator 82. The control 170 has also applied air under pressure to the fitting 174 of the ram 90 to actuate the rod 92 to the retracted position shown in FIG. 5. In this position the valves 52 are in the closed position shown in FIG. 7. This condition will exist so long as the roller 164 rides on the low part of the cam 158.

The switch 160 is moved to the other control position as when the roller 164 rides up on the high portion of cam 158 to actuate the pin 166 inwardly. In this control position, the control 170 is actuated to apply air pressure into the fitting 176 of ram 80 and the fitting 178 of ram 90. This causes the ram 80 to move to its retracted position whereby the valves 60 are moved to the closed position illustrated in FIG. 8. This also causes the valves 52 to move to the open position shown in FIG. 8, this movement being caused by the extension of the actuator rod 90. The valve members 62 and 72 are now in the position illustrated in FIG. 8. It will be apparent that when the roller 164 drops off the high portion of the cam, the control 170 will return the first-mentioned position and will apply air pressure to fittings 72 and 74 to thereby return the rams 80 and 90 to the position shown in FIG. 5, this, of course, returns the valves 52 and 60 to the position shown in FIG. 7.

The cam 158 is constructed to be adjusted to vary the circumferential extent of the high portion. This is achieved by providing a pair of adjacent high cam portions secured in a desired relative angular position by a friction clamp member 165 which has a pin extending through slotted portions of the adjacent high cam portions. This is a typical adjustable cam arrangement and, of course, other forms of adjustable cams may be used. It will be apparent that by adjusting the length of the high portion of cam 158, it is possible to vary the length of time the valve means 52 are open during a cycle of operation. This time period determines the measured amount of the charge of candy syrup to be dispensed into each mold.

The various mechanisms comprising the liquid molding machine are driven from a main drive shaft and are synchronized relative to one another by conventional means. It will be apparent that the dispensing mechanism and its various components will be synchronized relative to one another since the various elements all being driven from the main dispensing means drive shaft 140. Thus, both the belts 126 which actuate the cranks 120 for the plunger mechanism and the cam 144 which actuates the carriage assembly are driven directly from the drive shaft 140. Also, the cam 158 for the control switch 160 is synchronized with the cam 144 and the crank arms 120 since it is mounted on the shaft 132 and, thus, is also driven by the belt 136. The shaft 140 is also driven from a main drive shaft for the machine and is synchronized with the drive for the conveyor 10, such as for example, in the manner described in the above-mentioned patents, although any conventional drive arrangement may be employed.

Figure 4:
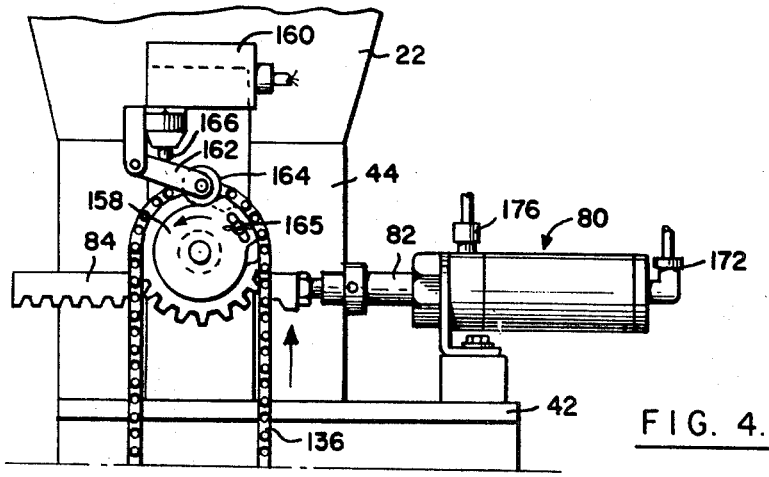
FIG. 4 is a fragmentary sectional view taken generally on line 4—4 of FIG. 2.

In setting up the machine prior to operation thereof, the parts will be set relative to one another to the positions illustrated in FIGS. 1 to 7. In this position of the parts, the carriage assembly 24 is positioned so that the discharge ports 58 are aligned with the cavities in a pair of adjacent molds on the conveyor. The angular position of the cam 158 is as illustrated in FIG. 4 with the leading edge of the high cam lobe just coming into contact with the follower roller 164. The cam 144 is set with a low portion contacting the roller 142 so that as the cam 144 begins to move the carriage assembly will move forwardly along with the conveyor. All the parts move in the direction illustrated by the arrows in FIGS. 1 and 4. With the switch in the position shown in FIG. 4, the control 170 will have been actuated to position the rams 80 and 90 to the posoition illustrated in FIG. 5 whereby the valves 52 are closed and the valves 60 are in their open position. The supply bucket 22, is, of course, filled with candy syrup prior to operation and the level of the candy syrup is maintained as desired in accordance with well known procedures.

It will be noted that this condition of the parts of the machine, the inlet passages 50 will be filled with syrup as is illustrated in FIG. 7. Also, the dispensing chambers 56 will be empty.

During the operation of the machine, the conveyor moves from left to right as viewed in FIG. 1. At the beginning of the cycle of operation the high portion of the cam 158 causes the switch 160 to move to an opposite control position which causes the rams 80 and 90 to actuate the valves to the opposite flow controlling positions. Thus, the valves are moved to the position illustrated in FIG. 8, the parts moving in the directions of the arrows in this figure. In this position, syrup is allowed to flow past the valves 52, which are now open, into the dispensing chambers 56. This flow will be allowed to continue as long as the cam follower roller 64 rides on the high part of the cam 158. When the roller 164 drops off the high part of the cam 158, the switch 160 is operated to its opposite flow controlling position to thereby signal the control 170 to cause the rams 80 and 90 to return to the position illustrated in FIG. 5. The valves 52 and 60 are thus returned to the position illustrated in FIG. 7 with the valves 52 being closed. However, during the period they were open, the individual charges of syrup have passed into the dispensing chambers 56 and since the valves 60 are now opened, the syrup is allowed to flow essentially to the bottom of the dispensing chambers in a position for dispensing.

It will be noted that during this part of the cycle of operation, the cam 144 has been rotating to allow the carriage assembly 24 to move along with the conveyor 10 with the cavities 19 of the pair of molds therebeneath. Also during this initial period of the cycle of operation, the crank arms 116 have been rotated to cause the plungers 100 to move part way down through the dispensing chambers 56 to a position above the outlet of the valves 52. During the next period of the cycle of operation, the plungers 100 will be moved downwardly to the lowermost end of the dispensing chambers 56 to force the syrup from the dispensing chambers and outwardly through the ports 58 into the cavities 19 in the molds 15 therebeneath.

The dispensing mechanism is now half way through its cycle of operation and the syrup has been dispensed into the cavities. During the remainder of the cycle of operation, the plungers 100 are returned to the upper position by the crank arms 116 and the carriage is returned to the starting position by the action of the cam 144, this starting position being illustrated in FIG. 1. Also during the remainder of the cycle of operation, the cam follower 164 will be riding on the low part of the cam 158 whereby the valves 52 and 60 are maintained in the position shown in FIG. 7.

During the entire cycle of operation of the dispensing mechanism, only two of the molds 18 will have passed the dispensing station of the machine and when the carriage assembly is returned to the starting position the next pair of molds will be aligned with the discharge nozzles 58 in preparation of a filling operation. The cycle of operation will be repeated to fill each successive pair of molds.

It will be noted that the amount of syrup which will be discharged from the dispensing mechanism will be a measured amount. This amount is determined by the length of time that the valves 52 are maintained in their open position. Since this time period can be very accurately controlled, the measured amount will be quite accurate. Moreover, since the cam 158 is adapted to provide an adjustable length of the high cam portion, the length of time that valves 52 are opened may be adjusted. In this manner, it is possible to vary the amount of the charge of syrup which will be dispensed into each mold cavity 19. Accordingly, a machine may be accurately adjusted for a particular size mold cavity.

It will be apparent that various changes may be made in the construction and arrangement of parts without departing from the scope of the invention. Accordingly, it is not desired to be limited except as required by the following claims.

What is claimed is:

1. A liquid molding machine comprising conveyor means for moving a plurality of candy forming molds along a path past a candy syrup dispensing station, said molds having open cavities into which candy syrup is to be dispensed, and means located at the dispensing station for dispensing candy syrup into said mold cavities as the molds move along the conveyor path past the dispensing station, said syrup dispensing means including a carriage assembly mounted for reciprocal movement along the path of movement of the molds, means for moving said carriage to advance the same in the direction of movement of the molds and at the same speed as said molds at a predetermined time in the cycle of operation of the machine, a syrup supply container mounted on said carriage assembly, a plurality of discharge ports for directing syrup into said mold cavities, means defining a path for the flow of syrup from said supply thereof to each of said discharge ports, the flow path to each discharge port including an inlet passage communicating with said syrup supply and a dispensing chamber communicating with a discharge port, means controlling the flow of syrup through said flow paths so that a measured amount of syrup is dispensed into each mold cavity, said flow control means including measuring valve means for controlling flow between an inlet passage and a dispensing chamber for each of the discharge ports, and means for opening said valve means to permit the flow of syrup therethrough for a predetermined time and then closing the same.

2. A liquid molding machine according to claim 1 wherein said flow control means includes a second valve means for controlling flow past said dispensing chambers to an associated discharge port.

3. A liquid molding machine according to claim 2 wherein said flow control means includes means for actuating said second valve means to a closed position when said measuring valve means is in an open position and means for actuating said second valve means to an open position when said measuring valve means is in a closed position.

4. A liquid molding machine according to claim 3 including a plunger means adapted to move into said dispensing chambers and force syrup therefrom outwardly through said discharge ports, and means for actuating said plunger means through a liquid dispensing operation when said carriage assembly is being advanced with said conveyor means and said second valve means is open.

5. A liquid molding machine according to claim 3 wherein each of said measuring valve means are comprised of cylindrical members rotatably mounted within cylindrical bores for rotation between said open and closed positions thereof.

6. A liquid molding machine according to claim 5 wherein a plurality of said measuring valve means are formed on a single elongated cylindrical rod and are spaced therealong.

7. A liquid molding machine according to claim 6 wherein said inlet passages comprise vertically extending bores aligned with said measuring valve means formed on said cylindrical rod.

8. A liquid molding machine according to claim 1 including plunger means adapted to move into said discharge chambers to force syrup therefrom out through said discharge ports and means for actuating said plunger means through a syrup dispensing operation when said carriage assembly is being advanced with said conveyor means.

9. A liquid molding machine according to claim 8 wherein said discharge chambers comprise a vertically extending bore and said plunger means are adapted to move downwardly through said bore during a liquid dispensing operation.

10. A liquid molding machine according to claim 1 including means for adjusting the length of time said measuring valve means is open during a cycle of operation to thereby vary the measured amount of liquid dispensed into each mold.

References Cited
UNITED STATES PATENTS

| | | | |
|---|---|---|---|
| 1,675,741 | 7/1928 | Waring | 141—242X |
| 2,868,242 | 1/1959 | Shelly | 141—137 |
| 2,908,298 | 10/1959 | Greenberg | 141—137 |
| 3,280,762 | 10/1966 | Shelly | 107—8C |

PRICE C. FAW, JR., Primary Examiner

U.S. Cl. X.R.

141—137, 242